No. 859,369. PATENTED JULY 9, 1907.
P. J. COLLINS.
DYNAMO ELECTRIC MACHINE.
APPLICATION FILED NOV. 30, 1904.
2 SHEETS—SHEET 1.
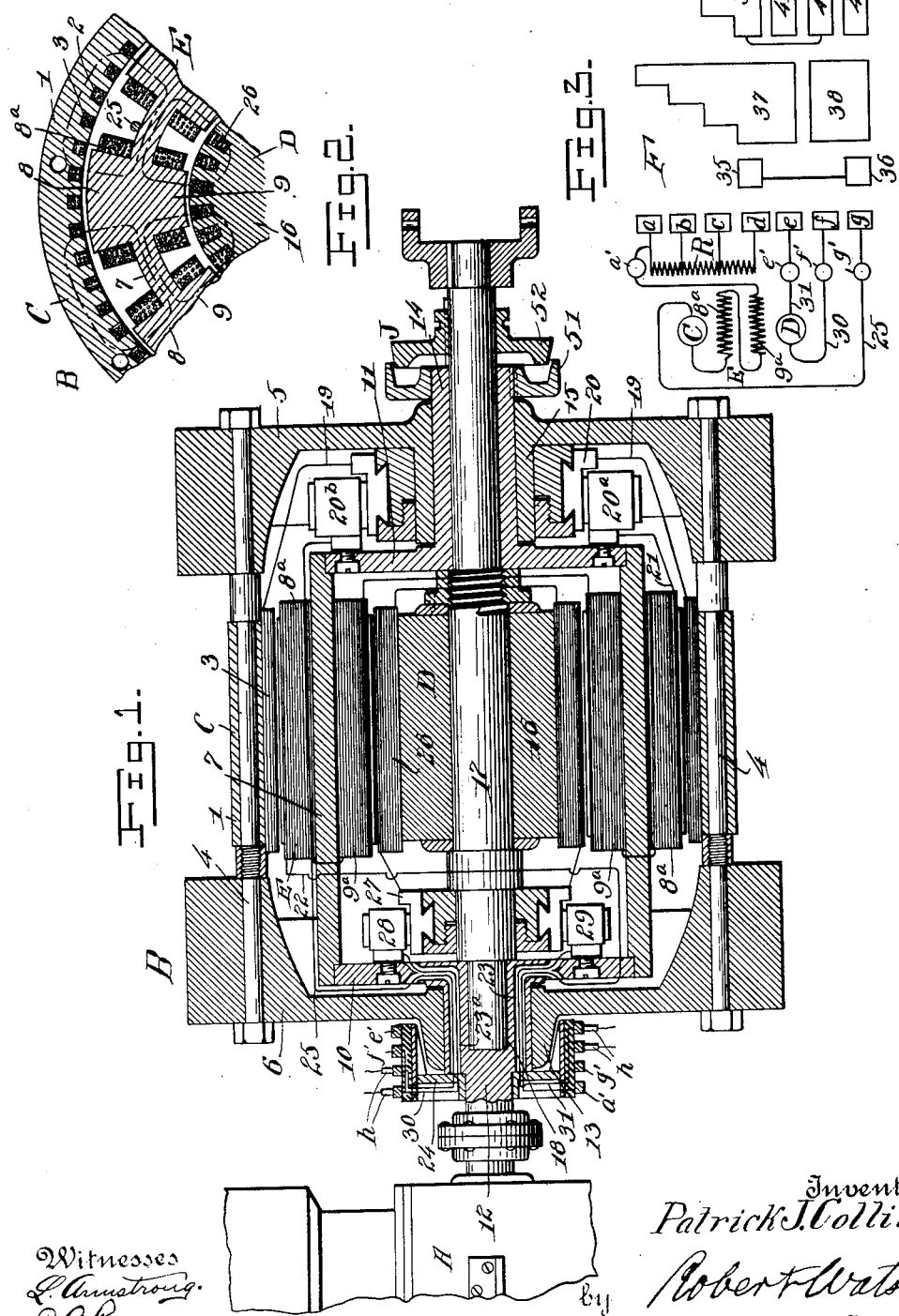
Witnesses
L. Armstrong.
J. B. Roman
Inventor
Patrick J. Collins,
by Robert F. Watson
Attorney No. 859,369.    
PATENTED JULY 9, 1907.

P. J. COLLINS.
DYNAMO ELECTRIC MACHINE.
APPLICATION FILED NOV. 30, 1904.

2 SHEETS—SHEET 2.

Witnesses
L. Armstrong
J. B. Roman

Inventor
Patrick J. Collins.

by Robert Watson
Attorney

UNITED STATES PATENT OFFICE.

PATRICK J. COLLINS, OF SCRANTON, PENNSYLVANIA, ASSIGNOR, BY MESNE ASSIGNMENTS, TO GENERAL ELECTRIC COMPANY, A CORPORATION OF NEW YORK.

DYNAMO-ELECTRIC MACHINE.

No. 859,369.

Specification of Letters Patent.

Patented July 9, 1907.

Application filed November 30, 1904. Serial No. 234,895.

*To all whom it may concern:*

Be it known that I, PATRICK J. COLLINS, a citizen of the United States, residing at Scranton, in the county of Lackawanna and State of Pennsylvania, have invented certain new and useful Improvements in Dynamo-Electric Machines, of which the following is a specification.

My invention relates to improvements in power transmitting mechanism, the construction and advantages of which will be pointed out in the following specification, taken in connection with the accompanying drawing, in which—

Figure 4:
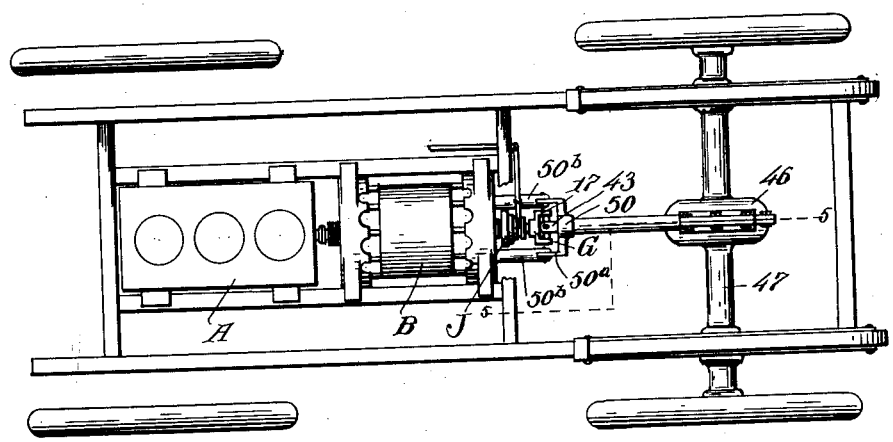
Figure 5:
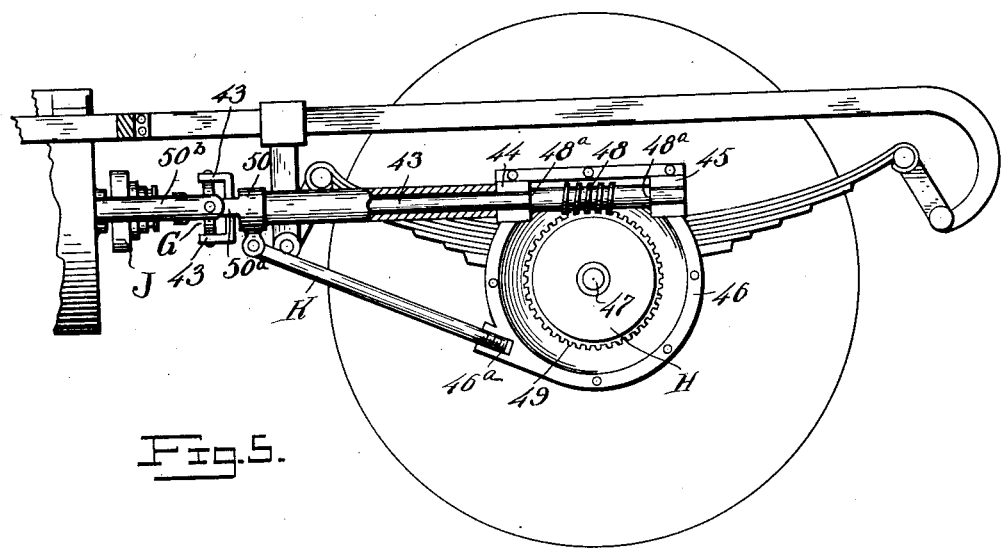

Figure 1 is a longitudinal vertical section through the dynamo electric machine, the engine being shown in part in side view; Fig. 2 is a section through part of the dynamo electric machine on the line 2—2 of Fig. 1; Fig. 3 is a diagram illustrating the series winding of the machine and the controller; Fig. 4 is a plan view of the power converting mechanism arranged to operate an automobile; and Fig. 5 is a section on the line 5—5 of Fig. 4.

Referring to Figs. 1 and 2 of the drawing, A, indicates an engine or prime motor of any suitable kind, and B, indicates a dynamo electric machine. The dynamo electric machine comprises an outer stationary armature C, an inner rotatable armature D and a rotatable field-member E, having field poles which co-act with both the outer and inner armatures. The outer member or armature C, as shown, consists of a ring core 1, having slots 2, on its inner face within which the armature coils 3 are wound. The core 1 is supported upon bolts 4, which extend through a pair of stationary end frames 5 and 6.

The intermediate field-member E consists of an annular core 7 having field pole pieces 8, projecting radially outward into proximity to the coils of the armature C, and field pole pieces 9 projecting radially inward toward the inner armature. Field coils $8^a$ and $9^a$ surround the pole pieces 8 and 9 respectively. The core 7 of the rotary member E is supported upon a pair of disks 10 and 11. The disk 10 has a hub 12, which is journaled in a bearing 13 in the end frame 6, and this hub is connected directly to the shaft of the engine A. The disk 11 has a tubular hub 14 fitting within a bearing 15 in the end frame 6. The core 16 of the inner armature D is secured to a shaft 17, one end of which, as shown, is journaled within a recess or bearing 18 in the hub 12, and the other end of the shaft 17 is journaled in the tubular hub or shaft 14.

It will be seen that when the engine is in operation the intermediate member E will be positively driven thereby, rotating in the stationary bearings 13 and 15, and that the inner member D is independently rotatable within its bearings in the hubs of the intermediate member.

The electrical connections between the coils of the various members of the machine are indicated diagrammatically in Fig. 1. The coils 3 of the armature C are connected by lead wires 19 to a stationary commutator 20, secured upon the bearing 15 of the end frame 6, and current which is generated in the coils 3 by the rotation of the intermediate field member is collected by brushes $20^a$ and $20^b$, which are suitably secured to the disk or end frame 11 of the intermediate member. The current is taken from the brush $20^a$ by a wire 21 to the field coils $8^a$ and $9^a$ of the intermediate member, and after passing around said coils is carried by a conductor 22 through a tubular opening 23 in the hub 12 to an insulated contact ring $a'$ carried upon a support 24, which is secured to the hub or shaft 12. The brush $20^b$ is connected to a contact ring $g'$ upon said support by a wire 25 passing between the coils of the magnets and the member E, as shown in Fig. 2, and through a tubular opening $23^a$ in the hub or shaft 12. The armature coils 26 of the inner member are connected to a commutator 27, which rotates with the armature shaft 17, and brushes 28 and 29, resting upon said commutator and supported by the end frame or disk 10 of the inner member, are connected by wires 30 and 31, passing through the tubular openings $23^a$ and 23, to contact rings $f'$ and $e'$ respectively. Brushes $h$ resting upon said contact rings are connected by suitable conductors to a controller F, Fig. 3.

As indicated in Fig. 3, the circuit leading from the generator armature C through the field coils $8^a$ and $9^a$ to the contact ring $a'$, is connected to a series of contact brushes $a$, $b$, $c$, and $d$, between which are arranged suitable resistance coils R. The circuit 25 from the opposite brush of the generator armature C, passing through the contact ring $g'$ is connected to a contact brush $g$ on the controller. The conductor 30 leading from one brush of the inner armature D is connected through the contact ring $f'$ to a contact block or brush $f$ on the controller and the conductor 31 leading from the opposite terminal of the motor armature D is connected through the contact ring $e'$ to a brush $e$ on the controller.

The controller has two contact pieces 35 and 36 electrically connected together, as shown, and these contact pieces are engaged by the brushes $d$ and $g$ on the first step of the controller, thus completing the circuit of the generator through the entire resistance R, the motor circuit remaining open. When the intermediate member E is rotated, current is generated in the armature C when the generator circuit is completed through the contact pieces 35 and 36. Normally, when the engine is in operation, the brushes *d* and *g* rest on the contacts 35 and 36, and a load is thus placed upon the generator when the motor is out of circuit for the purpose of preventing racing or sudden changes in speed in the engine. On the second step of the controller, the brushes *d* and *g* leave the contact pieces 35 and 36 and engage the contact pieces 37 and 38 respectively. At the same time the brushes *e* and *f* which form the terminals of the motor circuit, engage the contact pieces 37 and 38, respectively, and it will be seen that on the second step of the controller the current passing from the generator through the brush *g* to the contact piece 38 will then pass to the brush *f*, the motor armature D, brush *e*, to the contact piece 37, thence through the brush *d* and the entire resistance R to the rotary field and thence to the generator armature C. The contact 37 is stepped, as shown, so that as the controller is moved into successive positions the resistance will be gradually cut out of the motor circuit. To reverse the motor armature D, contact plates 39 and 40 are electrically connected together and plates 41 and 42 are electrically connected together so that when the controller is reversed the current from the generator will pass in an opposite direction through the armature of the motor.

In Fig. 4, I have shown the power converting mechanism applied to an automobile, for which purpose the mechanism is peculiarly adapted. In said figure the shaft 17 of the motor armature D is connected by a universal coupling G to a worm shaft 43, which, as shown in Fig. 5 is journaled at its rear end in bearings 44 and 45 within a casing 46, which incloses the differential gear mechanism H upon the rear axle 47. A worm 48 upon the shaft 43 meshes with the teeth of a worm gear 49 which drives the differential gearing. The shaft 43 extends through a bearing 50, which is arranged at the forward end of said shaft and connected to the adjacent end frame of the dynamo electric machine by a yoke 50$^a$, the arms of which are hinged to lugs or hinge-pieces 50$^b$, which are rigidly secured to the casing of the machine at each side of the motor shaft 17. The joints in the hinge are in line with the center of the universal coupling in order to permit the bearing 50 to move vertically with the shaft without binding. The thrust upon the worm shaft 43 is taken up by the shoulders 48$^a$ upon the worm and also by the bearing 50.

A clutch J, consisting of a member 51 secured to the tubular shaft 14, and a member 52 secured to the armature shaft 17 and movable longitudinally thereon, is provided for the purpose of coupling the two shafts together, so that the armature shaft 17 may be positively connected to and driven by the engine by disconnecting the electrical circuits and throwing the two clutch members into engagement with one another.

In operation the intermediate field member E of the dynamo electric machine is constantly driven by the engine A, and, in moving the vehicle ahead, the motor armature D rotates in the same direction as the field member E. The motor armature thus rotates at its normal speed with respect to the field member, and as the latter is constantly driven in the same direction by the engine, the motor armature will turn with respect to the fixed bearings of the machine at a speed equal to its normal speed relatively to the magnets, plus the speed at which the latter are driven by the engine. The motor armature may thus be wound for a moderate speed, relatively to its field magnets, and a strong torque, and yet will rotate at a high speed relatively to the fixed parts of the machine, with the same torque. It will also be apparent that the reversals of magnetism in the motor armature will not be any more frequent than if the field member E were stationary, notwithstanding the fact that the motor armature rotates at a much higher speed, with relation to the fixed parts of the machine, than it would if the field member E were stationary, and the motor armature operates with the same torque that it would have if the field magnet were stationary. In an ordinary electric motor having a stationary field, if the speed is increased above the normal speed for which the machine is properly designed, by variations in the windings, the torque is simultaneously diminished and likewise the efficiency.

The current in the motor armature may be varied, to vary the speed of the vehicle, or other load which is operated by the armature shaft. It will be evident from the foregoing that in moving forward, while the engine is running at normal speed, the motor shaft, which is connected to the vehicle driving mechanism, will move at the engine speed plus the speed of the inner armature. In moving backward, however, it is desirable to move at a slow speed, and it will be obvious that when the current is reversed in the inner or movable armature, its maximum speed in the reversed direction will be approximately one-half the engine speed.

When it is desired to drive the vehicle, or other load, directly by the engine, the electrical circuits may be disconnected and the clutch J moved to connect the tubular shaft of the rotatable field member with the armature shaft 17, in which case the load will be connected mechanically with the engine. If the electrical apparatus should become deranged therefore, the load may be driven directly by the engine. In operating electrically, the engine is operated at full speed, thus developing its full power, and the speed of the vehicle is controlled by controlling the electric motor.

For the sake of clearness the machine as shown is series wound, but it will be evident that it may be wound, and connected in various ways to suit the requirements of the work being done.

It will be obvious that many changes in details may be made, without departing from the spirit of my invention.

What I claim and desire to secure by Letters Patent, is:

1. The combination with a dynamo electric machine comprising a stationary member, an intermediate rotary member coacting with said stationary member, and a rotatable armature coacting with said intermediate member, of means for mechanically operating said intermediate member, a shaft connected to said rotatable armature by an universal joint and a bearing for said shaft hinged to a fixed support adjacent to said universal joint.

2. A dynamo electric machine comprising an outer stationary armature supported by suitable end-frames, an intermediate rotary field member having a tubular shaft journaled in said end-frame, an inner rotary armature having a shaft journaled in said tubular shaft, collector rings rotatable with said intermediate member, and circuits connecting said collector rings with the commutators of said armatures.

3. The combination with an engine, of a dynamo electric machine comprising an outer stationary member, an intermediate rotatable member having a shaft operatively connected to the engine, an inner rotatable member having a shaft journaled within the shaft of the intermediate member, and a clutch for connecting said shafts together.

In testimony whereof I affix my signature, in presence of two witnesses.

PATRICK J. COLLINS.

Witnesses:
ROBT. J. MURRAY,
M. C. COLLINS.